UNITED STATES PATENT OFFICE.

NOAH WRINKLE, OF KEELER, AND WILFRED W. WATTERSON, OF BISHOP, CALIFORNIA.

PROCESS FOR OBTAINING POTASSIUM CHLORID FROM CERTAIN WATERS CONTAINING BORAX.

1,232,156.

Specification of Letters Patent.

Patented July 3, 1917.

No Drawing. Application filed December 11, 1916. Serial No. 136,212.

*To all whom it may concern:*

Be it known that we, NOAH WRINKLE and WILFRED W. WATTERSON, citizens of the United States, residing at Keeler and Bishop, respectively, in the county of Inyo, State of California, have invented new and useful Improvements in Processes for Obtaining Potassium Chlorid from Certain Waters Containing Borax, of which the following is a specification.

This invention relates to methods of obtaining potassium chlorid from certain waters, also containing, among other salts, borax; and particularly from such waters as occur in inland lakes, or from solutions formed by dissolving in water the salts deposited on the bottoms of dry lakes, or from the solutions formed by dissolving in water the salts obtained by evaporation of waters of such lakes; and it is one of the particular objects of this invention to provide a suitable, efficient and economical process for separating potassium chlorid from the borax and other accompanying salts. It may also be an object to obtain certain of the other salts, including the borax; the invention being not specifically limited to obtaining the potassium chlorid only.

In general, this process comprises the preliminary elimination, or partial elimination of other and more insoluble salts, leaving the potassium chlorid and sodium borate, or a part of the sodium borate; and then the employment of special means for separating the borate from the potassium chlorid. Waters designed to be treated by this process may and do contain such minerals as sodium carbonate, sodium bicarbonate, sodium sulfate, sodium chlorid, potassium chlorid, sodium borate, and other minerals. For instance, the following compositions may be given as typical. The following composition is that of water from Searles lake in California.

| | |
|---|---|
| $Na_2CO_3$ | 4.10% |
| $Na_2SO_4$ | 6.60 |
| NaCl | 7.20 |
| KCl | 4.00 |
| $Na_2B_4O_7$ | 1.03 |
| Water | 77.07 |

And the following composition is that of concentrated water from Owens lake in California:

| | |
|---|---|
| $Na_2CO_3$ | 8.50% |
| $Na_2SO_4$ | 3.02 |
| NaCl | 9.06 |
| KCl | 6. |
| $Na_2B_4O_7$ | 3.60 |
| Water | 69.92 |

I.

We may, as an initial step in the process, eliminate nearly all of the sodium carbonate by treating the liquor with carbon dioxid, causing the formation of sodium bi-carbonate which is insoluble in the solution; the bi-carbonate being then removed from the solution. Or the elimination of the carbonate may be done as hereinafter stated.

The concentration of the solution is then proceeded with by evaporation. (It will be noted that wherever we speak of evaporation herein, such evaporation may be had by natural heat, as by exposure to the sun, or by artificial heat). This concentration is for the purpose of removing a portion of the sodium chlorid, sodium carbonate, and sodium sulfate, and to retain the borax and potassium chlorid in the solution.

This concentration of the solution may be continued to the saturation point of potassium chlorid at atmospheric or ordinary temperature, or to that degree of concentration where a portion of the borax will crystallize out of the solution upon cooling, but the potassium chlorid will all remain dissolved in the liquor. Having reached this point, in case the sodium carbonate has not been almost completely removed by the previous treatment of carbon-dioxid, as hereinbefore described, the concentrated solution is now subjected to further treatment with carbon dioxid after being cooled down to about 40° C. The insoluble bi-carbonate of soda formed is removed from the liquor, which is then permitted to further cool and deposit crystals of borax. When the deposition of borax has progressed as far as may be desired, or as far as may be efficient and practical, the liquor is removed and is then further concentrated by evaporation to the saturation point of potassium chlorid at the temperature required to effect the evaporation.

Now, it will be noted that this first step has, as its general result, the making of a solution which contains a high percentage of potassium chlorid, and which usually contains also a high percentage of sodium borate, but a low percentage of other salts. Although we find it practicable, and perhaps the most economical procedure, to deposit a portion of the borax by the method just described, this deposition is in no sense essential to practical working of the process, for the reason that the process includes the further removal of borax, as boric acid. Consequently, none of the borax need be removed before proceeding to completely remove the borax as boric acid in a later step in the process.

As an alternative to removing the sodium carbonate by treatment with carbon dioxid, as hereinbefore described, the carbonate may be left in the solution, and after the deposition of the crystals of borax, preferably before the complete concentration of the solution, the liquor from the borax crystals may be treated with lime to convert the sodium carbonate retained in the solution to sodium hydrate; and this sodium hydrate is sufficiently soluble to be retained in the solution until after the final separation of potassium chlorid from the solution. In this manner the carbonate is eliminated so far as the further operations are concerned.

II.

We then have (where the sodium carbonate has been sufficiently removed from the solution by the carbon dioxid) a solution which contains the original content of potassium chlorid, a part, or practically all of the original content of borax, and some of the sodium chlorid and other salts. Our preferred procedure is now to cool this solution, which, it will be remembered, contains potassium chlorid to saturation at the temperature employed in concentrating. The result of this cooling is to crystallize out the potassium chlorid, borax, sodium chlorid, and such other salts as may be insoluble at the lower temperature. Ordinarily, in such cases as hereinbefore cited, we obtain a deposit of mixed crystals consisting of about 60% of potassium chlorid, 30% sodium chlorid and other salts, and 10% borax. These mixed crystals are removed from the liquor; and the liquor, still retaining some potassium chlorid, borax and other salts, is mixed with other solutions that are undergoing the preceding steps of the process.

Our preferred procedure is to next dissolve these mixed crystals, potassium chlorid, borax, and sodium chlorid and other salts, in the least quantity of hot water necessary to perfect their complete solution.

We then have a clean solution which is suitable to be treated as hereinafter described; and we prefer to proceed in the manner just described, because this clean solution contains a lesser percentage of the undesired salts than does the concentrated solution from which the mixed crystals have just been deposited. But it will be understood that it is not essential to deposit the potassium chlorid, borax, sodium chlorid, and other salts, and re-dissolve them, preliminary to the following described steps of our process; but that the original hot solution containing all the salts may be at once treated as hereinafter described. This, however, is not so economical, for the general reason that the original concentrated solution contains a higher proportion of other salts as compared with the quantity of potassium chlorid contained. The immediately following step is for the purpose of acidifying the sodium borate, and a smaller quantity of the acidifying reagent is required when a new fresh solution is prepared than when the original concentrated solution is treated with the acidifying reagent.

We have discovered that it is difficult, if not impossible, to effect separation of potassium chlorid from borax by any of the usual methods of fractional crystallization; and that the deposition of potassium chlorid from solutions that also contain borax is always accompanied by the deposition of a considerable portion of borax. We have devised, and now describe, a simple and efficient means of completely removing the borax from the mixtures of salts obtained, as hereinbefore described, from the brines of salts of the various natural deposits, as we have described. And by this method we have succeeded in obtaining potassium chlorid from such deposits free from borax.

III.

The concentrated solution obtained as hereinbefore described is next treated with a borate acidifying reagent—with an acid or suitable acid forming gas or the like—for the purpose of converting the borax into boric acid. A suitable acid may be any of the mineral acids, or chlorin may be used to effect the decomposition and acidification. We consider the use of chlorin economical and advantageous; it is well adapted to effect the decomposition of the borax and cause the formation in the solution of boric acid and sodium chlorid. Hydrochloric acid would be equally efficient.

IV.

After all the borax has been converted into boric acid, the solution is concentrated by evaporation and then permitted to cool and deposit crystals of potassium chlorid, boric acid, sodium chlorid, and other salts; or the solution may be evaporated to dryness. Then the deposited mixed crystals, or the residue, is subjected to the following described treatment.

V.

The mixed crystals of boric acid, potassium chlorid, sodium chlorid, etc., are then treated with a sufficient quantity of alcohol (a boric acid solvent) to effect the solution of the boric acid. The undissolved crystals are removed from the alcohol solution and leached with fresh cold water to extract the sodium chlorid and any other contaminating salts that may remain in small quantities. The potassium chlorid is left free from borax, and free from other salts, and of suitable purity for any agricultural or technical purpose.

VI.

The alcoholic solution of boric acid is evaporated, the alcohol condensed and reevaporated for further use in the process; leaving a residue of boric acid.

From the foregoing description the nature of our invention will be understood. We have described in some detail preferred forms of procedure, but we do not mean thereby to limit ourselves to the specific procedures set forth except as indicated in the following claims.

Having described a preferred form of our invention, we claim:

1. The herein described method of obtaining potassium chlorid from waters containing the same and sodium borate and other salts, embodying first partially eliminating the salts other than the potassium chlorid and sodium borate so as to obtain a solution high in the chlorid and borate, treating the solution with an acidifying agent to form boric acid, depositing the chlorid and acid from the solution, and separating the boric acid thus formed by dissolving in alcohol.

2. The herein described method of obtaining potassium chlorid from waters containing the same and sodium borate, sodium chlorid and other salts, embodying first eliminating the other salts and concentrating to obtain a solution high in the three named salts, treating the solution with an acidifying agent to form boric acid, concentrating the solution by heat to deposit the named salts and acid, treating the mixed salts with alcohol to dissolve the boric acid formed and separating the solution thus formed, and washing out the sodium chlorid from the remaining mixture of sodium chlorid and potassium chlorid with clear cold water, leaving the potassium chlorid.

3. The herein described method of obtaining potassium chlorid from waters containing the same and sodium borate and other salts, embodying first partially eliminating the salts other than the potassium chlorid and sodium borate so as to obtain a solution high in the chlorid and borate, concentrating the solution by evaporation, depositing the chlorid and borate by cooling the concentrated solution, separating the mother liquor from the deposited salts and redissolving the salts in clear water, treating the solution with an acidifying agent to form boric acid, depositing the chlorid and acid from the solution, and separating the boric acid thus formed by dissolving in alcohol.

4. The herein described method of obtaining potassium chlorid from waters containing the same and sodium borate, sodium chlorid and other salts, embodying first eliminating the other salts and concentrating to obtain a solution high in the three named salts, concentrating the solution by evaporation, cooling the concentrated solution to deposit the named salts, separating the liquor from the deposited salts and redissolving the salts in clear water, treating the solution with an acidifying agent to form boric acid, concentrating the solution by evaporation to deposit the named salts and acid, separating and treating the deposited acid and salts with alcohol to dissolve the boric acid formed, and separating the solution thus formed, and washing out the sodium chlorid from the remaining mixture of sodium chlorid and potassium chlorid with clear cold water, leaving the potassium chlorid.

5. The herein described method of treating waters containing potassium chlorid, sodium borate, sodium sulfate, sodium carbonate, and sodium chlorid, embodying first concentrating by evaporation to remove part of the sodium chlorid, sodium carbonate and sodium sulfate to obtain a solution strong in sodium borate and potassium chlorid, the concentration being proceeded with to the saturation point of potassium chlorid at the temperature employed, removing the liquor from the deposited salts, then treating the solution with an acidifying reagent to form boric acid, then concentrating the liquor to deposit the contained salts and acid, separating and treating the mixed salts and acid with alcohol to dissolve the boric acid, removing the solution, and washing out the remaining salts with clear cold water leaving the potassium chlorid undissolved.

6. The herein described method of treating waters containing potassium chlorid, sodium borate, sodium sulfate, sodium carbonate, and sodium chlorid, embodying first concentrating by evaporation to remove part of the sodium chlorid, sodium carbonate and sodium sulfate to obtain a solution relatively strong in sodium borate and potassium chlorid, the concentration being proceeded with to the saturation point of potassium chlorid at the temperature employed in evaporating, removing the liquor from the deposited salts, depositing the salts from the liquor by cooling, removing the liquor from the deposited salts, redissolving the deposited salts in clear water sufficient to make a solution; then treating the solution with an acidifying reagent to form boric acid, then concentrating the liquor to deposit the contained salts and acid, removing and treating the mixed salts and acid with alcohol to dissolve the boric acid, removing the solution from the remaining salts, and washing out the remaining salts with clear cold water leaving the potassium chlorid undissolved.

7. The herein described method of treating waters containing potassium chlorid, sodium borate, sodium sulfate, sodium carbonate, and sodium chlorid, embodying first concentrating by evaporation to remove part of the sodium chlorid, sodium carbonate and sodium sulfate to obtain a solution relatively strong in sodium borate and potassium chlorid, cooling to deposit a portion of the sodium borate, removing the liquor and proceeding with the concentration to the saturation point of potassium chlorid at the temperature employed, removing the liquor from the deposited salts, depositing the salts from the liquor by cooling, removing the liquor from the deposited salts, redissolving the deposited salts in clear water sufficient to make a solution; then treating the solution with an acidifying reagent to form boric acid, then concentrating the liquor by evaporation to deposit the contained salts and acid, removing and treating the mixed salts and acid with alcohol to dissolve the boric acid, removing the solution from the remaining salts, and washing out the remaining salts with clear cold water leaving the potassium chlorid undissolved.

8. The herein described process of treating waters containing potassium chlorid, sodium borate, sodium sulfate, sodium carbonate, and sodium chlorid, embodying first treating the liquor with carbon dioxid to transform the carbonate to an insoluble bicarbonate and removing the liquor therefrom, then heating and evaporating the liquor to concentrate it to the saturation point of potassium chlorid at ordinary temperatures, then treating the liquor further with carbon dioxid to remove further sodium carbonate and then cooling to deposit sodium borate and removing the liquor, then further concentrating the liquor by evaporation to the saturation point of potassium chlorid at the temperature employed, then cooling the liquor to deposit the contained salts, removing the liquor to be returned to an original liquor being treated, re-dissolving the mixed salts in clear water, treating the solution with chlorin to form boric acid and sodium chlorid from the sodium borate, concentrating the solution and depositing the salts and boric acid therefrom, removing and treating the mixed deposit with alcohol to dissolve the boric acid and removing the solution, and washing out the salts with clear cold water leaving undissolved the potassium chlorid.

In witness that we claim the foregoing we have hereunto subscribed our names this 27th day of November 1916.

NOAH WRINKLE.
WILFRED W. WATTERSON.

Witnesses:
S. C. F. WRINKLE,
L. H. WATTERSON.